Sept 17, 1957  A. L. WITCHEY  2,806,544
SOUND SOURCES FOR MICROPHONE CALIBRATION
Filed Oct. 15, 1953  2 Sheets-Sheet 1
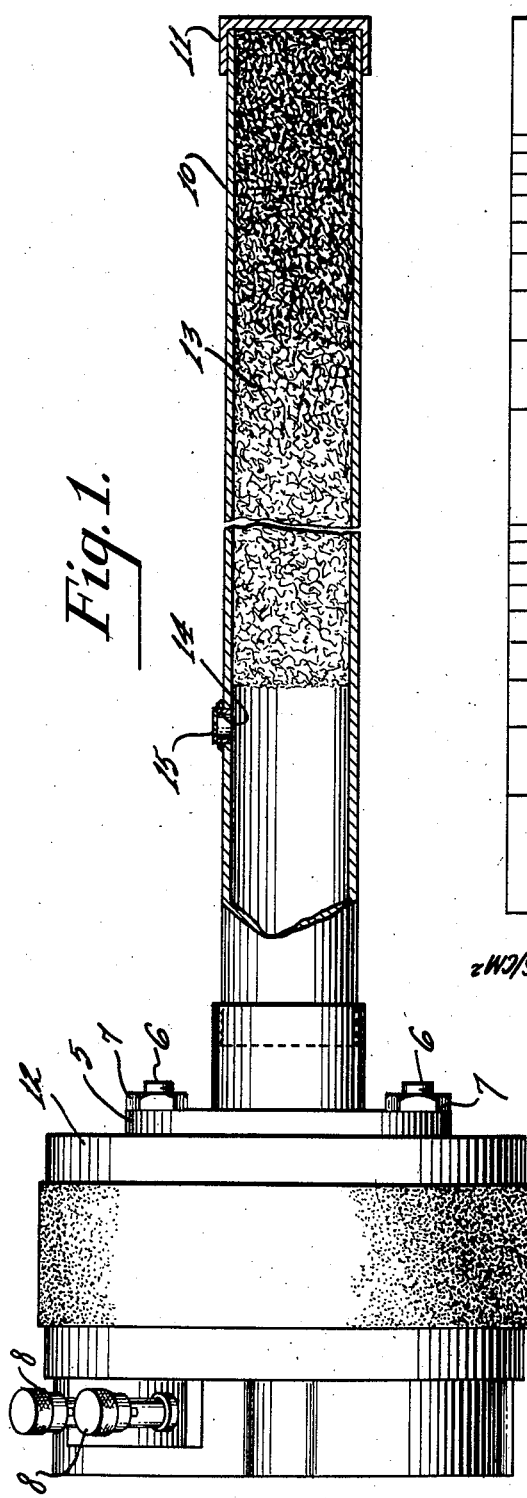
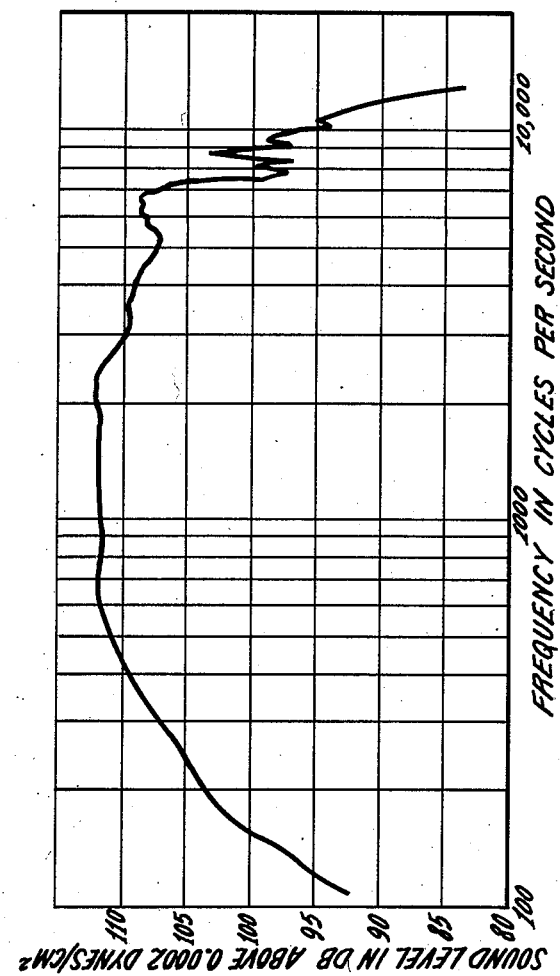
INVENTOR.
Albert L. Witchey
BY
ATTORNEY Sept 17, 1957 A. L. WITCHEY 2,806,544
SOUND SOURCES FOR MICROPHONE CALIBRATION
Filed Oct. 15, 1953 2 Sheets-Sheet 2
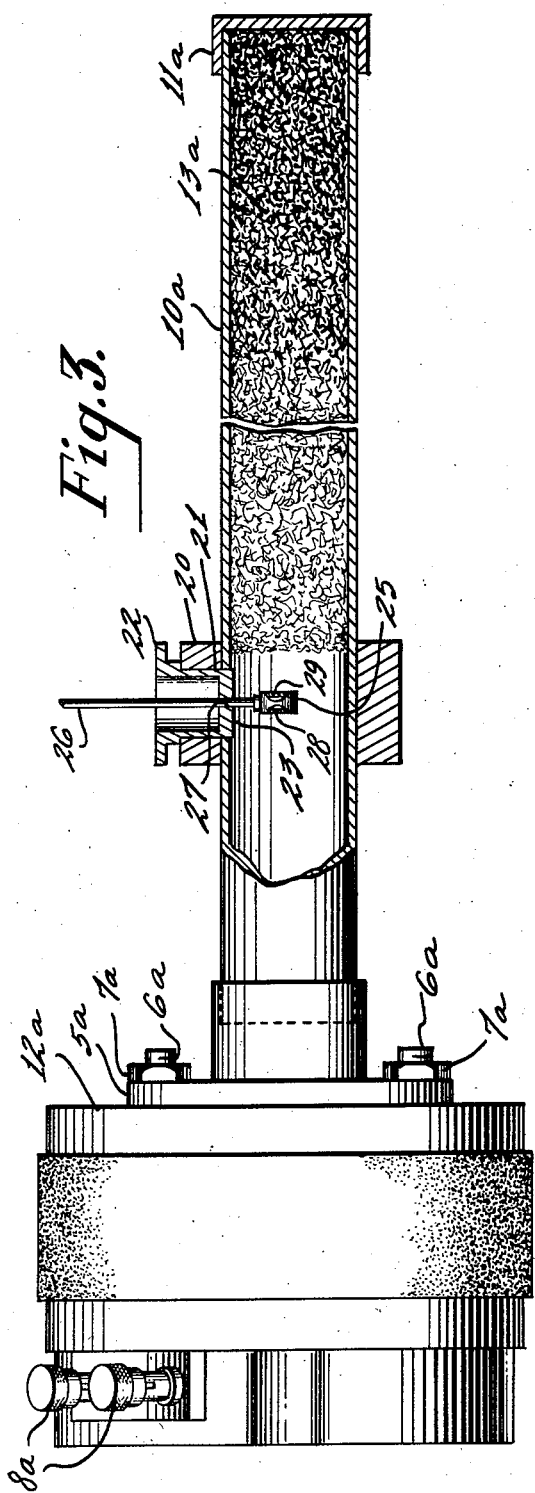
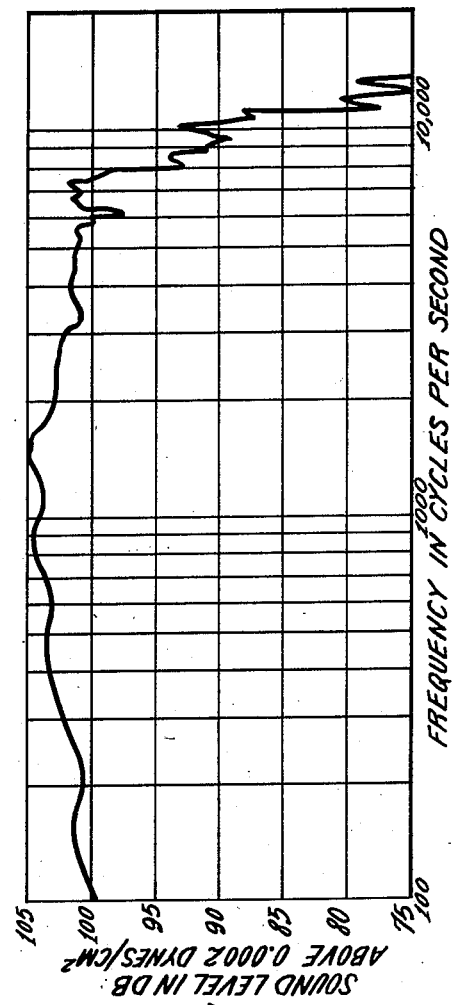
INVENTOR.
Albert L. Witchey
BY Morris A. Raban
ATTORNEY United States Patent Office 2,806,544
Patented Sept. 17, 1957

2,806,544

SOUND SOURCES FOR MICROPHONE CALIBRATION

Albert L. Witchey, Merchantville, N. J., assignor, by mesne assignments, to the United States of America as represented by the Secretary of the Air Force Application October 15, 1953, Serial No. 386,158

4 Claims. (Cl. 181—.5)

This invention relates to microphone testing, and more particularly to sound sources for testing gradient or noise cancelling microphones.

Gradient microphones transmit signals from a close source while rejecting random noises from distant sources. They are used to transmit intelligible speech from noisy environments such as airplane cabins. The pressing need for a simple reliable method of determining the discriminating ability and characteristics of these microphones is fulfilled by the present invention.

The principal characteristics which must be determined over the full operating frequency range in order to evaluate a gradient microphone are the ratio of near to distant response and directivity.

Measurement of the near frequency response characteristic of gradient microphones has been heretofore complicated by use of available small sound sources which did not provide a constant sound pressure level over the full operating frequency range. The microphone sound pressure level versus frequency curves obtained with these sources were distorted by the variation in sound pressure level supplied by these sources at different frequencies.

A free field room was heretofore thought necessary to determine the distant and directional response characteristics of gradient microphones. There were no simple methods utilizing relatively inexpensive uncomplicated equipment which could be used in measuring the characteristics of these microphones either in the laboratory or in production.

The principal object of this invention is to provide equipment facilitating a simple method of measuring the near response, distant response and directional characteristics of gradient microphones.

Another object is to provide simple inexpensive test equipment for measuring the characteristics of gradient microphones.

A further object is to provide test equipment of this type which can be operated by production personnel.

A small sound source, providing a substantially constant sound pressure level over its operating frequency range and producing a spherical wave front similar to that produced close to the human mouth while speaking, is constructed of a tube which has one closed end. A loudspeaker horn driving mechanism is installed in the other end of the tube. A section of the closed end of the tube is filled with sound absorbing material, such as "Ozite," whose density is greatest near the closed end of the tube. A small orifice is located in the wall of the tube at a point between the horn mechanism and the filled section.

Since the source provides a substantially constant sound pressure level over the operating frequency range the pressure frequency response curve of a microphone measured with this source will be the true pressure versus frequency characteristic of the microphone, undistorted by variations in sound pressure level of the source.

The distant and directional characteristics of the gradient microphones are determined by sampling the plane sound waves within the tube which are similar to ambient noise waves propagated from a distant source. The pressure sensitive elements of the microphone are inserted through an aperture provided in the wall of the tube into the path of these plane waves.

Figure 1 is an elevational view, partially in cross section, of a small spherical wave sound source embodying the invention;

Figure 2 is the frequency versus sound pressure level curve of the source shown in Figure 1;

Figure 3 is an elevational view partially in cross section of a plane wave sound source embodying the invention;

Figure 4 is the frequency versus sound pressure level curve of the source shown in Figure 3.

In Figure 1, a tube 10 is shown. The end of the tube 10 is closed by the cap 11. A loudspeaker horn driving mechanism 12 is installed at the other end of the tube. The driving mechanism 12 may be of any usual type normally coupled to a horn. It is secured to the tube flange 5 by studs 6 and nuts 7. Terminals 8 are provided for connecting the horn driving mechanism to an oscillator (not shown). A sound absorbing material 13 fills a portion of the closed end of the tube as shown. "Ozite" has been used with excellent results. The "Ozite" is packed more closely near the closed end of the tube so that its density is greatest near the closed end adjacent the cap 11. A straight sided orifice 14 is located in the wall of the tube between the horn mechanism and the Ozite filled section.

The orifice is sized to simulate the human mouth as a source. In practice a ¼" diameter orifice has operated satisfactorily. This size is not critical and it is felt that orifices from approximately ⅛" to 1" in diameter would function satisfactorily. For the ¼" diameter orifice, the depth may be approximately ⅛".

The distance from the horn driving mechanism to the sampling orifice has not been found to be critical. The tube should be long enough so that the acoustic impedance of the tube and damping material will be substantially purely resistive. This will prevent formation of standing waves and provide a plane wave structure through the tube. A silk covering 15 over the orifice 14 decreases turbulence at low frequencies. When a signal is supplied to the horn drive mechanism by an oscillator, plane sound waves will travel through the tube from the horn mechanism into the absorbing material.

To obtain the near frequency response characteristic of a gradient microphone the pressure sensitive portion is held a short distance away from the orifice in the path of spherical waves propagated from the orifice. The frequency of the oscillator is varied over the microphone's operational frequency band. A curve is plotted of the near response of the microphone with respect to the sound pressure level produced by the source over the frequency band. Since the sound pressure level provided by the sound source is substantially constant over this frequency band, the plotted curve will be a true representation of the near response of the gradient microphone under test. In production, this characteristic can be easily obtained by an oscillograph operated by production personnel.

In Figure 2 is shown a curve of spherical wave sound pressure level versus frequency provided by a source of the type shown in Figure 1. The flatness of the curve demonstrates that the sound pressure level is substantially constant through the range of from 200 to 7000 cycles per second which covers the practical operating range of the gradient microphones measured.

In the embodiment of the invention illustrated in Figure 3, a tube 10a which is used to provide plane waves is shown. It is similar to the apparatus shown in Figure 1 with the exception of the provision for sampling. The same parts in Figures 1 and 3 are given the same reference characteristics with the suffix "a" added. A collar 20 is slipped over the tube 10a at the sampling point. An aperture 21 extends radially through the collar and tube. A bushing 22 is inserted in the aperture 21. The bushing is free to rotate within the collar. Pressure sensitive elements 25 of a microphone are inserted within the tube and are supported on a rod 26 which projects through a hole 27 in the end wall 23 of the bushing 22. It will be understood that the rod 26 is designed to accommodate connections, electrical or acoustic, depending upon whether the entire microphone is inserted within the tube or only its pressure sensitive elements. One sound entrance port 28 of the pressure sensitive elements 25 faces the horn driving mechanism while the other sound entrance port 29 faces the Ozite damping material.

The distant response characteristic of a microphone whose pressure sensitive elements are disposed as shown in Figure 3, can now be readily obtained by plotting the frequency versus sound pressure level curve in a manner similar to that described previously. An oscillograph can be used by production personnel to obtain this characteristic also. To obtain the directional characteristic the elements can be rotated through a full 360°. The sound level can be measured throughout its rotation.

In Figure 4 is shown a curve of plane wave sound pressure level versus frequency provided by a source of the type shown in Figure 3. The flatness of the curve demonstrates that the sound pressure level is substantially constant through the range of 200 to 7000 cycles per second which covers the practical operating range of the gradient microphones measured.

In production it would be impractical to plot the directional characteristic over the entire frequency band. A satisfactory method of spot checking the directional characteristic is accomplished by using a complex signal which is made up of waves of a number of frequencies. It has been found that a sine wave which is modified as a warble band between 500 and 1250 cycles per second will produce a satisfactory complex wave. The directional characteristic using this complex wave will provide a combined directional characteristic which will indicate whether the directional frequency response characteristics of the gradient microphone is within allowable tolerance. A complex signal commonly known as "white noise" which is made up of all frequencies over a given band could also be used.

Use of these novel sound sources provides an accurate and uncomplicated method of evaluating gradient microphones. Expensive free field rooms for measuring the distant and directional responses characteristics are no longer necessary. The problem of testing production gradient microphones has been simplified to the point that regular production personnel can easily carry out accurate reliable acceptance tests of these extremely delicate instruments.

What is claimed is:

1. A small sound source having a substantially flat frequency response characteristic with respect to sound pressure and producing essentially spherical waves for measuring the near response characteristics of noise cancelling microphones comprising a tube having one closed end, a sound wave generator disposed at the other end of said tube, a sound absorbing medium filling a section of said tube extending from said closed end to a position between said ends of said tube, said tube having a circular orifice therein communicating the interior of said tube with the ambient, said orifice being located between said sound wave generator and said filled section, and said orifice being of a size which provides a wavefront which simulates the wavefront produced by the human mouth.

2. A small sound source having a substantially flat frequency response characteristic with respect to sound pressure and producing essentially spherical waves for measuring the near response characteristics of noise cancelling microphones comprising a tube having one closed end, a sound wave generator disposed at the other end of said tube, a sound absorbing medium filling a section of said tube extending from said closed end to a position between said ends of said tube, said tube having a circular orifice therein communicating the interior of said tube with the ambient, said orifice being located between said sound wave generator and said filled section, said orifice being of a size which provides a wavefront which simulates the wavefront produced by the human mouth, and a covering of material having the acoustical characteristics of silk over said orifice to decrease the effect of turbulence at low frequencies.

3. A small sound source having a substantially flat frequency response characteristic with respect to sound pressure and producing essentially spherical waves for measuring the near response characteristics of noise cancelling microphones comprising a tube having one closed end, a sound wave generator disposed at the other end of said tube, a sound absorbing medium filling a section of said tube extending from said closed end to a position between said ends of said tube, said tube having a circular orifice therein communicating the interior of said tube with the ambient, said orifice being provided by an aperture in said tube located between said sound wave generator and said filled section, a short hollow cylindrical member disposed with one end thereof wholly within said aperture and the other end thereof extending into the ambient, and the internal diameter of said cylinder being small with respect to the diameter of said tube to provide a wavefront which simulates the wavefront produced by the human mouth.

4. A small sound source according to claim 3 including a covering over said other end of said aperture of material having the acoustical characteristics of silk.

References Cited in the file of this patent

UNITED STATES PATENTS

| | | |
|---|---|---|
| 1,743,414 | Wente | Jan. 14, 1930 |
| 2,043,984 | Adler | June 16, 1936 |
| 2,063,527 | Solowinski | Dec. 8, 1936 |
| 2,106,813 | Romanow | Feb. 1, 1938 |
| 2,210,415 | Kellogg | Aug. 6, 1940 |
| 2,278,668 | Piety | Apr. 7, 1942 |